April 16, 1968         K. C. DE GROFF         3,378,678
LIGHTING SYSTEM FOR PHOTOGRAPHY
Filed June 17, 1965                    5 Sheets-Sheet 1

Inventor:
Kenneth C. DeGroff,
by Hood, Gust & Irish
Attorneys.

April 16, 1968     K. C. DE GROFF     3,378,678

LIGHTING SYSTEM FOR PHOTOGRAPHY

Filed June 17, 1965     5 Sheets-Sheet 3

Inventor:
Kenneth C. DeGroff,
by Hood, Gust & Diel
Attorneys.

United States Patent Office  3,378,678
Patented Apr. 16, 1968

3,378,678
LIGHTING SYSTEM FOR PHOTOGRAPHY
Kenneth C. De Groff, 1920 S. Michigan St.,
South Bend, Ind. 46618
Filed June 17, 1965, Ser. No. 464,724
18 Claims. (Cl. 240—1.3)

ABSTRACT OF THE DISCLOSURE

A lighting apparatus for photography having a circular track mechanism and a plurality of photographic lighting devices mounted on the track mechanism for independent movement. Each of the lighting devices are connected to the track mechanism by an elongated arm. Each arm is connected at one end to a member depending from the track mechanism in a manner allowing universal swiveling movement between the arm and the depending member and is similarly connected at the other end to one of the lighting devices. The arms and lighting devices depend from the track. The lighting devices are universally movable into a desired position by means of a remote control mechanism. A single beam-producing lamp is mounted in the center of the track mechanism to emit a beam of light downwardly and thereby to indicate the intersection of a vertical axis passing through the center of the track mechanism with the floor surface therebelow. A platform mounted on rollers and movable over the floor surface below the track mechanism is provided for supporting the subject to be photographed. A back drop and a lighting device mounted on a track mechanism in the floor is provided for controlled shadow effects.

---

The present invention relates to a lighting system for photography and more particularly to such a lighting system uniquely adapted for use by professional photographers in their studios.

In the art of commercial photography, lighting of the subject for the purpose of providing highlights, shadows, modeling and the like is resorted to for the purpose of providing desired photographic effects. It is conventional to use a plurality of photographic lights placed at different positions in an area surrounding the subject, and this requires some considerable skill and knowledge in order not only to obtain the proper lighting on the subject but to produce a photographic negative or exposure having the desired characteristics. Such lights are ordinarily supported from the floor of the studio and are manipulated manually to different positions with respect to the subject. In making these adjustments, the distance of each light from the subject must be carefully controlled in order to achieve the necessary exposure, fill-in and background illumination, and the camera adjustment (adjustment of the lens opening) must be performed with care so as to provide a desired density in the photographic negative when a picture is taken. Ordinarily, when subjects of different character ar photographed in sequence, this necessitates adjustment of all of the lighting parameters so as to obtain the desired photographic result. Thus, it will appear as obvious that not only is a substantial amount of skill and knowledge required in being able to obtain photographs of different subjects on a production basis, but some considerable time is required in adjustment of the various lighting parameters.

It is therefore an object of this invention to provide a photographic lighting system which is simple, efficient and economical in construction and operation.

It is another object of this invention to provide a lighting system for photography which requires a minimum of skill and knowledge in order to obtain photographs of consistent, high quality.

It is yet another object of this invention to provide a photographic lighting system wherein a photographer can view the subject through the camera lens or viewfinder while a plurality of lights are being adjusted individually, the character of the lighting on the subject being viewed constantly during the period of adjustment.

It is still another object of this invention to provide a photographic lighting system wherein a plurality of lights may be individually rotationally adjusted about a common center with such center being accurately indicated for placement of the subject to be photographed.

It is still a further object of this invention to provide an accurate indication for subject placement with respect to a plurality of individually adjustable lights whereby the intensity of illumination on the subject may be maintained at a substantially constant level throughout the process of adjustment and while the subject is being viewed through the camera-viewing device.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

Figure 1:
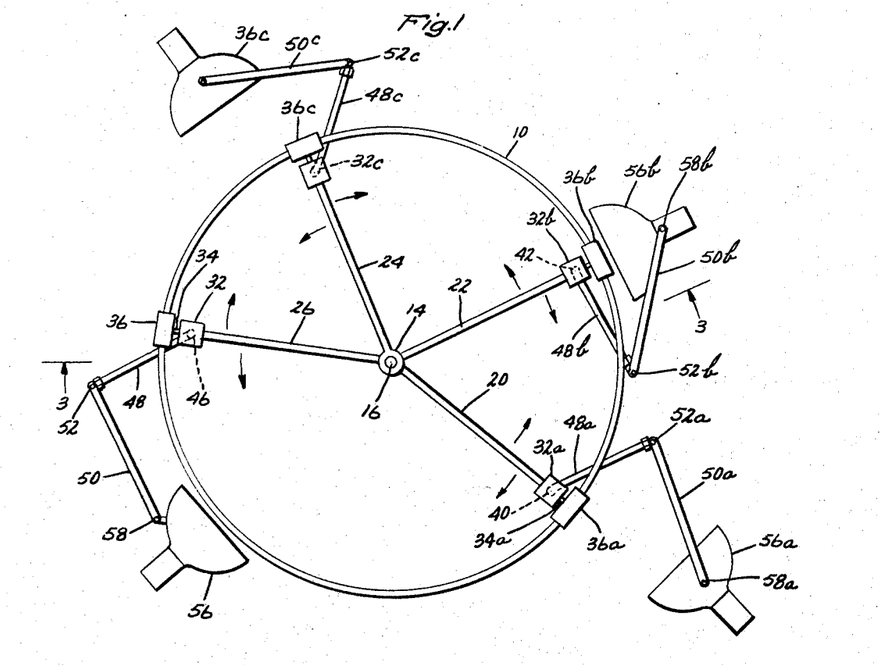
FIG. 1 is a top plan view of one embodiment of this invention.
Figure 2:
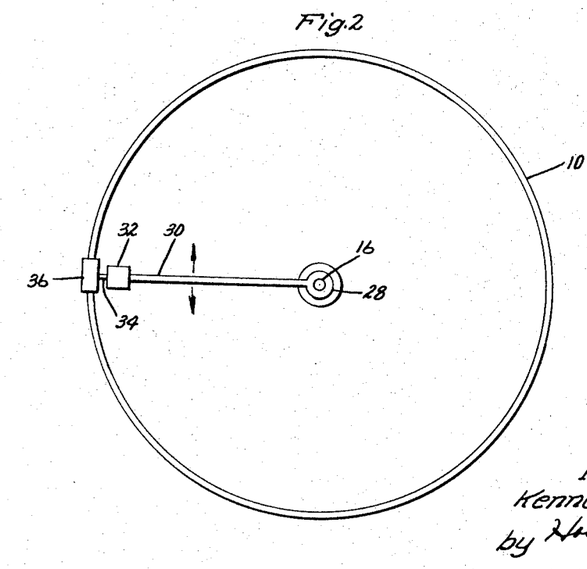
FIG. 2 is a similar top plan view showing only a single mount for a lighting device.
Figure 3:
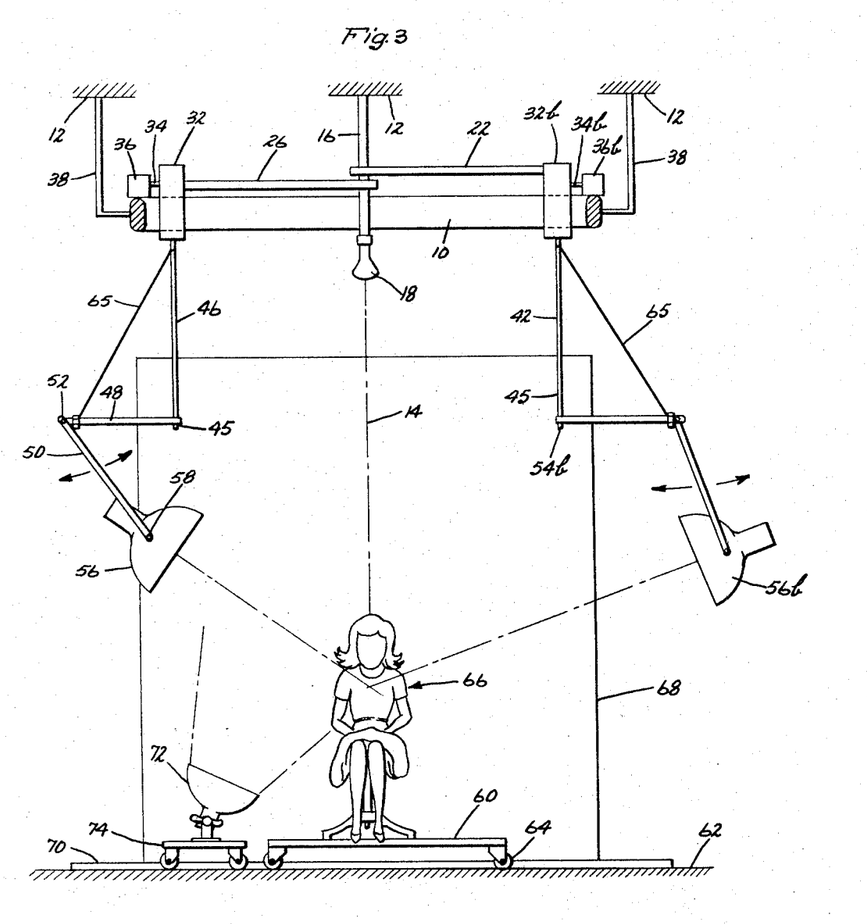
FIG. 3 is a view taken substantially along the section line 3—3 of FIG. 1 and showing only two lights.

Referring to the drawings, and more particularly to FIGS. 1, 2 and 3, the photographic lighting system comprises an annular track 10 rigidly mounted on and suspended from a ceiling 12 in a position which is concentric about a vertical axis indicated by the dashed line 14. Secured to the ceiling 12 and depending therefrom coaxially with respect to the axis 14 is a suitable supporting post 16 which has mounted on the bottom end thereof a spotlight 18 capable of emitting a small beam of light of about one (1) inch in diameter downwardly coaxially of the axis 14.

Mounted for rotation on the supporting post 16 are a plurality of horizontal radius arms indicated by the numerals 20, 22, 24 and 26 in FIG. 1. In this FIG. 1, there are four (4) such arms shown; however, as will appear obvious to a person skilled in the art, a greater or lesser number of arms and attachments may be used without departing from the spirit and scope of this invention. For the purpose of describing the construction of these arms, only a single arm 26 is shown in FIG. 2. One end 28 of this arm is suitably rotatably secured to the supporting post 16 for rotation thereabout. The opposite end 30 of this arm has secured thereto a reversible electric motor 32 having a radially outwardly extending shaft 34 which is secured to a roller 36. Operation of the motor 32 in one direction will cause rotation of the roller 36 in a corresponding direction, and reverse operation of the motor 13 will cause reverse rotation of the roller 36. The roller 36 is positioned to engage the top, round edge of the rail or track 10 as is shown more clearly in FIG. 3 such that operation of the motor 32 will result in the radius arm 26 swinging through a complete angle of 360°.

Each radius arm 20, 22, 24 and 26 carries a similar motor and roller arrangement on the outer end thereof, these being indicated by the same numerals appearing in FIG. 2 but with a suffix letter added. Inasmuch as the embodiment of this invention as shown in FIG. 1 uses four (4) such radius arm assemblies, 26, 32, 36, the rail 10 will be required to carry a correspondingly heavy load, and for this purpose a suitable number of strong frame members 38 secured at one end of the ceiling and at the other end to the rail 10 need to be used. The necessary strength and design requirements for these members 38 will become more apparent from the description following.

Rigidly secured to and depending vertically from the motors 32, 32a, 32b and 32c, respectively, are four (4) vertically aligned supporting rods or members indicated by the numerals 40, 42, 44 and 46. These rods preferably are of equal length and are secured rigidly at the upper ends thereof to the bottom portions of the four motors 32, 32a, 32b and 32c. Thus, as the various radius arms 20, 22, 24 and 26 rotate, the depending supporting rods 40, 42, 44 and 46 will correspondingly rotate therewith. Preferably, each of the supporting rods 40 through 46 are positioned equal radial distances from the vertical axis 14.

Figure 7:
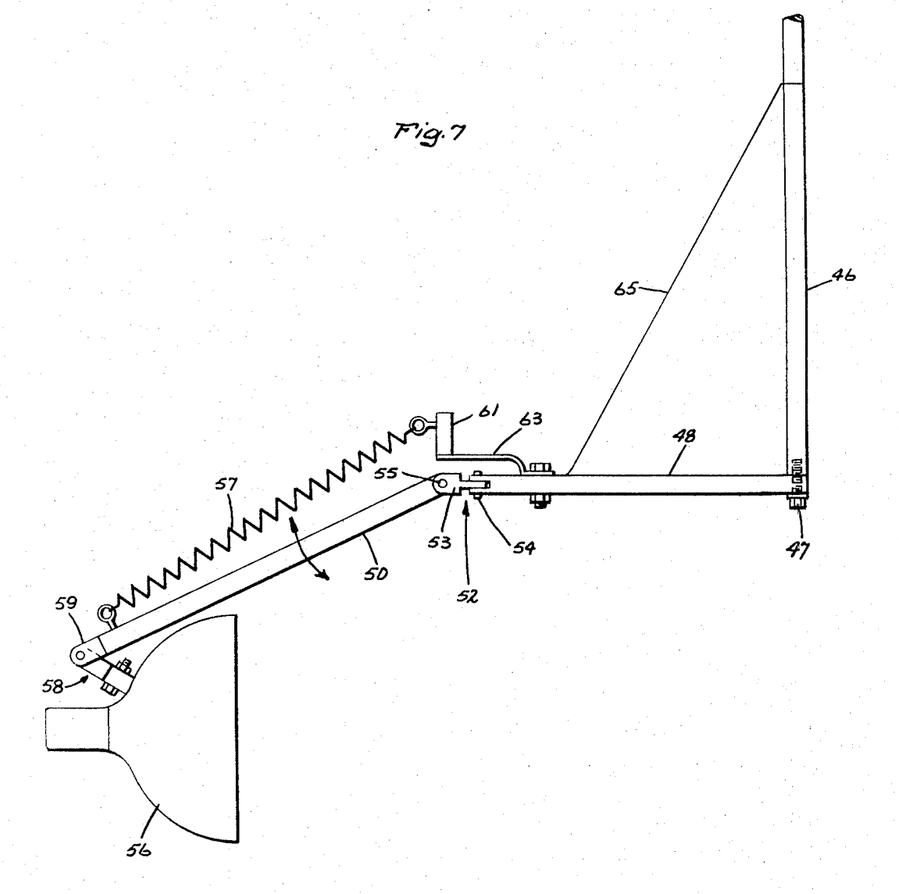
FIG. 7 is an enlarged, fragmentary illustration of the apparatus of FIG. 1 showing in more detail a practical operating design for one of the operating arm mechanisms.

Each of the supporting rods 40, 42, 44 and 46 carries on the bottom end thereof a conventional photographic lamp which is capable of universal swiveling movement. All of the mounts for these lamps are constructed identically such that a description of one hereinafter will suffice for all. Using the supporting device which is carried by the supporting rod 46 as the example, as viewed in FIGS. 1, 3 and 7, this device includes two rigid, elongated arms 48 and 50 which are pivotally joined at one end thereof to provide an elbow generally indicated by the numeral 52. The other end of the arm 48 is pivotally connected to the lower end of the supporting rod 46 for horizontal rotation about a vertical axis, such movement being provided, for example, by a pivot pin or bolt 47 which passes through the arm 48 and into the rod 46. A universal joint is preferably used for the elbow 52, this joint including (FIG. 7) a link 53 pivotally joined to the end of arm 48 by a vertical pin 54 and also to the end of arm 50 by a horizontal pin 55.

On the free end of the lower arm 50 is mounted a conventional photographic light or lamp 56, this connection as indicated by the numeral 58 also being of the universal swiveling type as provided by a ball and socket connection. Here again, this connection may take several different conventional forms without departing from the spirit and scope of this invention so long as the lamp 56 is capable of being swiveled to different positions with respect to the arm 50.

Such lamps 56 as used by commercial photographers are usually relatively heavy such that it is necessary not only for the supporting members 46, 48 and 50 to be correspondingly strong but for the joints 52 and 58 to possess enough frictional resistance to movement to be capable of holding the lamp 56 in any position in which it might be manually adjusted. For example, as shown in FIG. 3, the joints must possess enough resistance against movement that the lamp 56 can be held in the position shown. In the alternative, instead of relying solely on friction in articulated joints, each arm 48 and 50 may be provided with extensions which carry counterbalance weights that partially offset the weight of the lamp 56. Suitable tension springs 57 are preferably connected between the lower end 59 of arm 50 and an upright post 61 to counterbalance the weight of the lamp 56. Such post 61 is supported over and above joint 52 by a frame piece 63 secured to arm 48. It will be understood that each of the arm assemblies, 48a–50a, 48b–50b, and 48c–50c are also equipped with counterbalancing spring devices like the device 57, 61 shown in FIG. 7: for purposes of simplifying and clarifying the illustrations of FIGS. 1 and 3, these spring devices have not been shown.

Suitably strong cords or cables 65 are connected between the upper ends of the rods 40, 42, 44 and 46 and the outer ends of the respective arms 48, 48a, 48b and 48c for supporting the latter in horizontal alignment.

It will now be apparent that with the lamp 56 adjusted to the position shown in FIGS. 1 and 3, rotation of the radius arm 26 by means of the motor 32 will result in the lamp 56 describing a true circle around the axis 14. The same is true of the remaining lighting devices which are indicated by the same reference numerals with suffix letters added. By the independent operation of each motor 32a, 32b and 32c, the remaining lighting devices can be individually rotationally adjusted about the axis 14. It will now be apparent that the four lighting devices as shown in FIG. 1 may be independently adjusted to four different rotational positions about the axis 14.

As shown more clearly in FIG. 3, a small platform 60 is positioned on the floor surface 62 which is level and horizontal and spaced some ten (10) to twelve (12) feet from the ceiling 12. This platform 60 is conventionally mounted on casters 64 such that it can be moved to any adjusted position while a subject, indicated by the numeral 66, is seated thereon. As shown in FIG. 3, the subject 66 is positioned beneath the annular rail 10 in the exact center thereof so that it is intersected by the axis 14.

Figure 4:
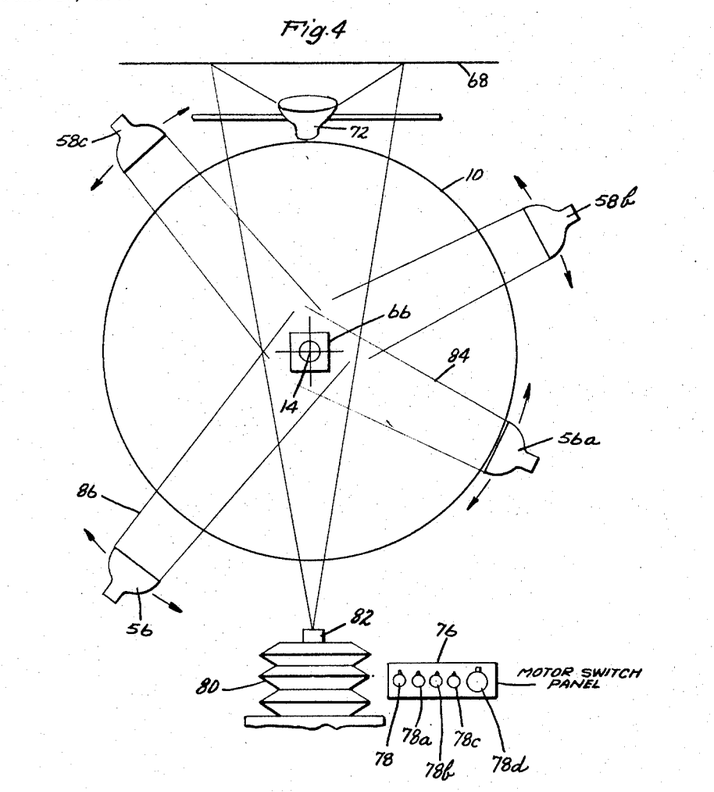
FIG. 4 is another top plan view in diagrammatic form used in explaining the operation of this invention, this figure illustrating the typical placement of a camera and control panel.

As shown in FIGS. 3 and 4, positioned behind the subject 66 and also behind a vertical projection of the rail 10 is an upright curtain or backdrop 68 of conventional design. Situated between the backdrop 68 and the vertical projection of the rail 10 is a suitable track 70 which extends parallel to the plane of the backdrop 68. Mounted on this track 70 for movement thereon is a lamp 72 which may be identical to the lamp 56 with the exception that it is adapted to cast a divergent beam of light onto the backdrop for the usual purpose od shadow control. This lamp 72 is preferably mounted on a small, electric motor driven platform 74 which may be operated from a remote location to move the lamp 72 selectively in leftward and rightward directions as may be desired. In FIG. 3, the lamp 72 is indicated as being located in a leftward direction, and in FIG. 4 it is indicated as being centered.

Figure 5:
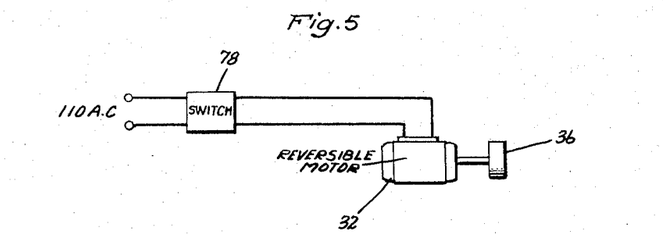
FIG. 5 is a simple electrical circuit diagram showing connections to one of the reversible motors.

Referring once again to FIGS. 1 and 3, it is there shown that the lamps 56, 56a, 56b and 56c may be moved to different positions vertically and horizontally with respect to the axis 14. In these positions, the lamps may individually be swung clockwise or counterclockwise with respect to the axis 14 without changing their radial positions. In order to accomplish this individual rotational movement, a control device, indicated by the numeral 76 in FIG. 4, has four (4) reversing switches 78, 78a, 78b, 78c connected thereto, respectively. There are preferably four (4) electrical and independently operable circuits involved, one for each motor 32, 32a, 32b and 32c. One typical circuit is shown in FIG. 5 wherein the actuating switch 78 is shown as being electrically connected to the reversible motor 32. The switch 78 preferably has three different positions, an "OFF" position during which the motor 32 will not be energized, a "FORWARD" position which results in energization of the motor 32 in one direction, and a "REVERSE" position which energizes the motor 32 in the opposite direction. Thus, the individual switches 78, 78a, 78b, 78c may be independently operated to cause movement of the radius arms 20, 22, 24 and 26 individually and independently in opposite directions.

Similarly, a circuit including a like switch 78d controls the operation of the backdrop light 72.

As shown in FIG. 4, the control device 76 is situated immediately adjacent to a camera 80 of conventional design. The camera 80 preferably is mounted on a stationary support a suitable distance from the axis 14 as shown. In a practical arrangement, this camera 80 is preferably provided with a viewfinder which may be used in viewing the subject 66 through the camera lens 82. Also, the camera is preferably equipped with the usual variety of lens stops, three such stops corresponding to values of 4, 5.6 and 8 being used. However, as will appear in the following, the conventional photographic studio camera may be used without departing from the spirit and scope of this invention.

In operation, the system of this invention may be used as follows. If it is assumed that a portrait is to be taken of the head and shoulders of an individual, he is first seated on a stool located on the platform 60 (FIG. 3). The spotlight 18 is first energized, which results in an axial beam of small cross-section being vertically directed downwardly in alignment with the axis 14. The individual on the platform 60, indicated by the numeral 66, is positioned beneath the light beam until the beam strikes the top of his head, it being assumed that the individual has his head upright and is looking forwardly toward the camera 80 (FIG. 4). The platform 60 may be moved around over the floor surface 62 until the light beam becomes centered. Being in this position, it may be said that the axis 14 intersects the individual's head.

Next, and now referring to FIG. 4, let it be assumed that only the lamp 56a is energized. As shown, it is positioned in line with the vertical projection of the rail 10 and is directed so that the beam 84 therefrom illuminates the head and shoulders of the subject 66. While the beam 84 is thus directed onto the subject 66, the photographer views the subject in the usual way through the lens 82 or the viewfinder on the camera 80. The photographer thereupon operates the switch 78a in a desired direction to move or rotate the light 56 about the axis or center 14. He may first swing the light counterclockwise as viewed in FIG. 4 until the desired key lighting of the subject is obtained. Conversely, he may swing the light 56a clockwise for this same purpose. In any event, as soon as he secures the desired rotational position of the light 56a, he merely operates the switch 78a to the "OFF" position, at which time the lamp stops its movement and remains in position with the beam 84 shining on the subject 66.

Next, the lamp 56 as shown in FIG. 4 is positioned as shown. Since this light 56, in this example of operation, is intended to be used as a fill-in light, it is moved radially outwardly from the center 14 a greater distance than the light 56a. In this radially adjusted position, the light 56 is energized and casts its beam 86 onto the subject 66. The photographer still views the subject 66 through the viewfinder, observing the lighting effect thereon. While continuing to view, the photographer operates the switch 78 to alter the circumferential position of the light 56 until the precise lighting effect is achieved. While continuing to view, the photographer may wish to alter the circumferential position of the light 56a, and this is accomplished merely by reaching to one side and operating the switch 78a. Thus, it will be apparent that the circumferential positions of the two lights 56 and 56a may be individually adjusted while the photographer is viewing the subject through the viewfinder or lens in the camera 80.

Backlighting may be obtained by similarly adjusting the two lamps 58b and 58c, the circumferential positioning thereof being accomplished at the control device 76 by operating the respective switches 78b and 78c. The positioning of all of the lamps is effected without the photographer ever leaving the camera or discontinuing viewing of the subject 66 through the viewfinder. By this means, precise lighting effects may be obtained by making incremental, circumferential adjustments of the lights individually. Even the most unskilled person can obtain a lighting effect which pleases him in a minimum of time and with a minimum of inconvenience such that a considerable efficiency in operation is realized.

To obtain control of shadows the light 72 is energized to direct a divergent beam of light onto the backdrop 68. The left and right positions of the lamp 72 are controlled by means of a reversing switch 78d located on control panel 76, this adjustment being effected while viewing the subject through the camera 80.

The description thus far has been primarily concerned with the circumferential positioning of the primary or key light 56a (FIG. 4) circumferentially and the fill-in lights 56, 56b and 56c also circumferentially. However, not only is it necessary in the art of photography to position the lights circumferentially with respect to the subject but also vertically and horizontally. Such vertical and horizontal adjustment of the various lamps 56, 56a, 56b and 56c is accomplished by arms 48 and 50 which are pivotally connected together and to rod 46. Thus, the lamps 56 may be positioned at various levels above and below the lower end of the supporting rod 46. Overhead lighting is therefore obtainable as well as floor lighting. The lengths of arms 48 and 50 are made such that the respective lamps may be moved to a point immediately adjacent to the subject 66 and also well back therefrom. With the camera positioned as shown in FIG. 4, it is possible to position a lamp immediately beneath or immediately above lens 82 without any of the supporting structure 46, 48 and 50 coming within the view of the lens 82. Additionally, if it is desired to position a lamp behind the subject 66 so that its beam will be directed toward the lens 82, it is necessary that the equipment be capable of two requirements: the first being to position the lamp out of the field of view of the lens 82 and secondly to position the various supporting members 46, 48 and 50 out of this same field. By using the particular supporting assembly 46, 48 and 50 as previously described, it will immediately become apparent that the lights may be positioned for any photographic effect without any equipment or lights coming within the field of view of the camera lens.

With respect to avoiding the field of view of the camera lens, it is, therefore, desirable that the lower ends 45 of the supporting rods 40, 42, 44 and 46 be positioned just above the field of view of the camera lens when the supporting rod is positioned on a straight line which coincides with the lens axis.

Figure 6A:
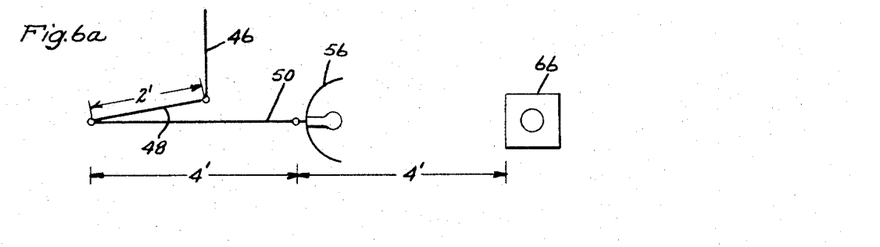
FIGS. 6a through 6d are diagrammatic illustrations used in explaining the operation of this invention.

A further independent advantage residing in the independent, universal adjustment of the plurality of lamps is the fact that simple positioning of the lamps can automatically provide the proper illumination of the subject. This may be explained more clearly in connection with FIGS. 6a through 6d. In these figures, like numerals indicate like parts. Referring first to FIG. 6a, let it be assumed that the arm 48 is two (2) feet long, and that the arm 50 is approximately four (4) feet long. Also assume that the subject 66 is approximately four (4) feet from the lamp 56 when the two arms 48 and 50 are swung to the angle shown. In other words, the two arms 48 and 50 are almost in line with each other. With the lamp 56 in this position, the intensity of the illumination on the subject 66 may be regarded as one light-unit.

Figure 6B:
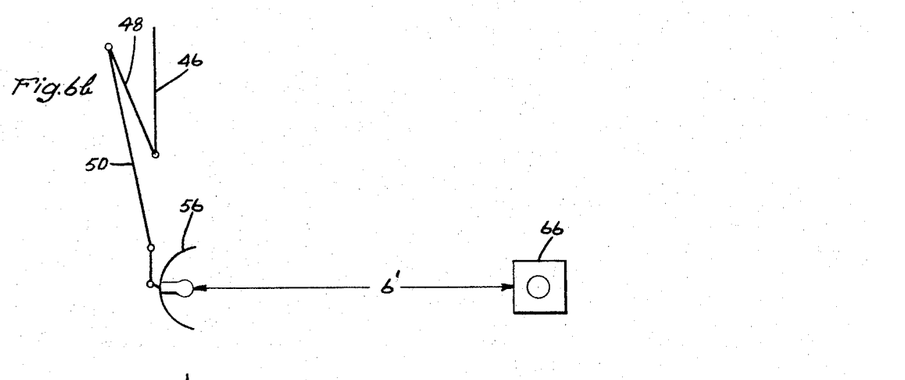
Figure 6C:
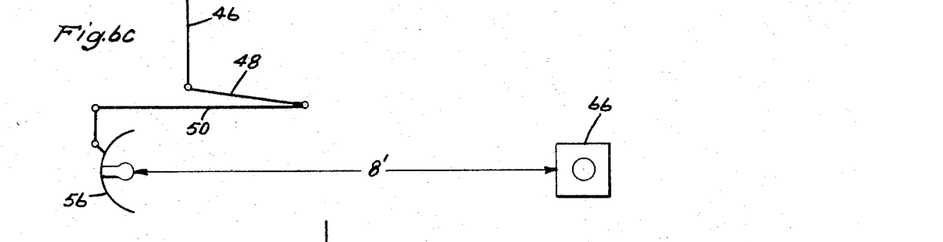

Now by moving the two arms 48 and 50 into almost horizontal alignment, as shown in FIG. 6b, the distance from the lamp 56 to the subject 66 becomes six (6) feet. This position of FIG. 6b thereby provides about one-half the light intensity on the subject 66 as the position of FIG. 6a.

Figure 6D:
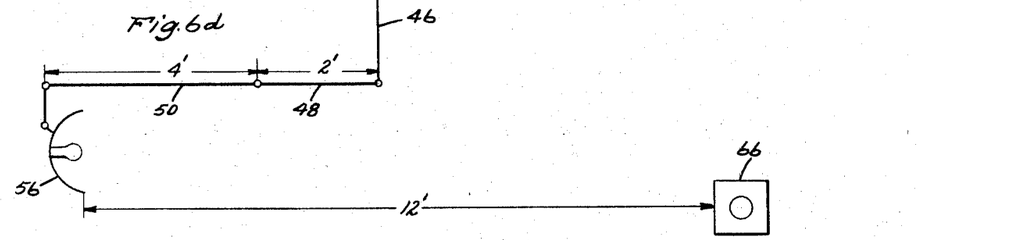

By moving the arms 48 and 50 into substantial horizontal radial alignment with the subject 66, the distance between the lamp 56 and the subject 66 becomes approximately eight (8) feet. The quantity of light now reaching the subject 66 is about half of that in FIG. 6b. With the arms as shown in FIG. 6d, and the distance being twelve (12) feet between the lamp 56 and the subject 66, the quantity of light reaching the subject is only about half of that in the example of FIG. 6c. As may now be apparent to a person skilled in the art, the amount of light cast on the subject for the different positions of FIGS. 6a through 6d will correspond to four different, conventional "f" stops in the camera 80 such that once the camera is positioned in the studio and the lamps 56 are adjusted to generate a given intensity of illumination, the mere mechanical positioning of the lamps through the use of the arm arrangement 48, 50 will be made to correspond to particular, known "f"-stops in the camera 80. A photographer therefore does not need to use a light meter in determining the proper camera settings in order to take photographs of given, predetermined negative density.

By using the center light 14, the subject may be precisely centered with respect to the centers of rotation of the individual lamps. By making the individual lamps individually and selectively adjustable rotationally about the axis 14, the desired, balanced lighting on the subject 66 may be quickly achieved by viewing the subject through the camera viewfinder. By reason of the lamps being universally movable vertically and horizontally, further lighting effects as desired may be obtained, but more importantly the lamps may be positioned in the immediate proximity of the camera without any part of the equipment entering the field of view or in the atlernative they may be placed around to the rear of the subject for backlighting effects also without coming into the field of view.

In addition to the foregoing, by reason of the particular mounting of the lamps whereby they may be moved vertically and horizontally, the required intensity of illumination on the subject for a given, predetermined lens stop may be obtained without the use of an exposure meter or any kind of a device for measuring the intensity of the light reflected from the subject.

As will now be apparent to a person skilled in the art, the apparatus of this invention may be used to obtain high quality photographs in a minimum of time without requiring a high degree of skill. A further advantage lies in the fact that the extreme versatility of adjustment found in this invention permits the photographer to view the subject all during the time lighting adjustments are being made. He can thus exercise to the fullest extent and devote his entire attention to creating artistic lighting effects. The time which was required previously, in the use of prior art systems, for the photographer to vary the adjustment of the individual lights may now be utilized efficiently in the creation of artistic effects.

Instead of using the spotlight 18, any other equivalent center-locating device may be used whether it be mechanical, optical or electrical. A depending rod substituted for the spotlight could be used. A plumb-line as used in connection with the surveyor's transits could be used. Photo-electric and optical devices would also suffice.

With respect to use of the spotlight 18, when the centering operation has been completed, it is turned "Off" prior to taking the photographs. The purpose of this spotlight 18 is to locate the center only and not to illuminate for photographic exposures.

While there have been described above the principles of this invention in connection with specific apparatus, it is to be clearly understood that this description is made only by way of example and not as a limitation to the scope of the invention.

What is claimed is:

1. In a lighting system for photography, a horizontal circular track adapted to be supported in an elevated position above a central area in which a subject to be photographed may be disposed, a plurality of photographic lighting devices mounted on said track for independent movement in a circular pattern about the center of said track, means for selectively and independently controlling the circular movement of said lighting devices such that one light may be rotatably positioned with respect to and independent of all of the others, a spotlight mounted in an elevated position on the center axis of said track and positioned to emit a light beam downwardly coaxially of said axis; each said lighting device including an upright depending supporting member which extends a predetermined distance below said track, a pair of arms joined at one end thereof for universal swiveling movement with respect to each other, one of said arms being joined for swiveling movement about a vertical axis to the lower end of said supporting member, a photographic light mounted on the free end of the other arm for universal swiveling movement, whereby said light may be universally positioned with respect to said supporting member within a space as limited by the lengths of said arms, a backdrop disposed outside the circle of said track in horizontal registry with said central area, and a light positioned adjacent to said backdrop for illuminating the same.

2. The system of claim 1 including a platform mounted on rollers and movable over a floor surface beneath said circular track, said platform being movable into a position to be intersected by said coaxial light beam.

3. In a lighting system for photography, a horizontal circular track adapted to be supported in an elevated position above a central area in which a subject to be photographed may be disposed, a plurality of photographic lighting devices mounted on said track for independent movement in a circular pattern about the center of said track, means for selectively and independently controlling the circular movement of said lighting devices such that one light may be rotatably positioned with respect to and independent of all of the others, a spotlight mounted in an elevated position on the center axis of said track and positioned to emit a light beam downwardly coaxially of said axis; each said lighting device including an upright depending supporting member which extends a predetermined distance below said track, a pair of arms joined at one end thereof for universal swiveling movement with respect to each other, one of said arms being joined for swiveling movement about a vertical axis to the lower end of said supporting member, a photographic light mounted on the free end of the other arm for universal swiveling movement, whereby said light may be universally positioned with respect to said supporting member within a space as limited by the lengths of said arms.

4. In a lighting system for photography, a horizontal circular track adapted to be supported in an elevated position above a central area in which a subject to be photographed may be disposed, a plurality of photographic lighting devices mounted on said track for independent movement in a circular pattern about the center of said track, means for selectively and independently controlling the circular movement of said lighting devices such that one light may be rotatably positioned with respect to and independent of all of the others, a spotlight mounted in an elevated position on the center axis of said track and positioned to emit a light beam downwardly coaxially of said axis; each said lighting device including an upright depending supporting member which extends a predetermined distance below said track, a pair of arms joined at one end thereof for universal swiveling movement with respect to each other, one of said arms being joined for swiveling movement about a vertical axis to the lower end of said supporting member, a photographic light mounted on the free end of the other arm for universal swiveling movement, whereby said light may be universally positioned with respect to said supporting member within a space as limited by the lengths of said arms, a camera positioned below the level of said track in a given horizontally spaced relationship with respect to said axis, said pair of arms having lengths such that the light mounted thereon may be selectively positioned in three different predetermined distances radially from said axis, the first position providing said camera with one unit of light reflected from a subject intersected by said axis, the second position providing about one-half unit of reflected light, and the third position providing about one-fourth unit of reflected light to said camera.

5. In a lighting system for photography, a horizontal circular track adapted to be supported in an elevated position above a central area in which a subject to be photographed may be disposed, a plurality of photographic lighting devices mounted on said track for independent movement in a circular pattern about the center of said track, means for selectively and independently controlling the circular movement of said lighting devices such that one light may be rotatably positioned with respect to and independent of all of the others, a spotlight mounted in an elevated position on the center axis of said track and positioned to emit a light beam downwardly coaxially of said axis; each said lighting device including an upright depending supporting member which extends a predetermined distance below said track, a pair of arms joined at one end thereof for universal swiveling movement with respect to each other, one of said arms being joined for swiveling movement about a vertical axis to the lower end of said supporting member, a photographic light mounted on the free end of the other arm for universal swiveling movement, whereby said light may be universally positioned with respect to said supporting member within a space as limited by the lengths of said arms, said pair of arms having lengths such that the light mounted thereon may be selectively positioned three different distances radially from said axis, the first position providing one unit of illumination on a subject intersected by said axis, the second position providing about one-half of said unit on such subject, and the third position providing about one-fourth of said unit on said subject.

6. In a lighting system for photography, a plurality of individual and separately operable photographic lighting devices, means mounting said lighting devices above a given horizontal surface area for rotation about a common vertical axis independently with respect to each other, said axis intersecting said surface area, means including a control device remote from said lighting devices for rotating said lighting devices individually and separately about said axis with respect to each other, means for indicating the intersection of said axis with said area; each of said lighting devices including a subject-illuminating lamp and means supporting said lamp for universal adjustment both vertically and horizontally, whereby all of said lamps may be adjusted independently with respect to each other rotationally, vertically and horizontally.

7. The apparatus of claim 6 wherein said lighting devices each include a supporting member having vertically spaced upper and lower ends, and said supporting means includes an articulated carrier means having opposite first and second end portions, said carrier means being connected at said first end portion to the lower end of said supporting member, the subject-illuminating lamp being attached to said second end portion, said carrier means being movable relative to said supporting member and including means for adjusting said lamp toward and away from said axis and also to positions above and below said lower end.

8. The apparatus of claim 6 wherein said lighting devices each include a supporting member having vertically spaced upper and lower ends, a pair of arms joined at one end thereof for universal swiveling movement with respect to each other, one of said arms being joined for horizontal pivotal movement to the lower end of said supporting member, said lamp being mounted on the free end of the other arm for universal swiveling movement, whereby said light may be universally positioned with respect to said supporting member within a space as limited by the lengths of said arms.

9. The appartus of claim 6 wherein said lighting devices each include a supporting member having vertically spaced upper and lower ends, a pair of arms joined at one end thereof for universal swiveling movement with respect to each other, one of said arms being joined for horizontal swiveling movement to the lower end of said supporting member, said lamp being mounted on the free end of the other arm for universal swiveling movement, whereby said light may be universally positioned with respect to said supporting member within a space as limited by the lengths of said arms, said rotating means including a plurality of motors attached to said supporting members, there being one motor for each supporting member, each said motor including means for swinging the respective supporting member selectively about said axis.

10. The apparatus of claim 6 wherein said mounting means includes a circular track adapted to be supported in an elevated position concentrically with respect to said vertical axis, each lighting device including a horizontal radius arm having one end disposed adjacent to said axis and the other end operatively engaged with said track, said other end carrying a roller engaged with said track for circular movement about said axis, and a motor on said other end having a driving connection with said roller for rotating the latter.

11. The apparatus of claim 6 further comprising a separately operable photographic lighting device on the horizontal surface area below said plurality of lighting devices, said last-mentioned lighting device including means movable over said surface area for supporting a subject-illuminating lamp, a subject-illuminating lamp mounted on said movable means, means for guiding the movement of said movable means, and means operatively connected to said movable means and actuable by said control device position remote from said movable means for moving said last-mentioned lighting device over said surface area.

12. The apparatus of claim 6 wherein said indicating means is a beam-producing lamp positioned above said surface to emit a beam of light downwardly and coaxially of said axis.

13. In a lighting system for photography, a plurality of individual and separately operable photographic lighting devices, means mounting said lighting devices above a given horizontal surface area for rotation about a common vertical axis independently with respect to each other, said axis intersecting said surface area, means for indicating the location of a line-like axis coaxial with said vertical axis in the space between said surface area and a predetermined location thereabove; said means for indicating said line-like axis being mounted a predetermined distance above said surface area and extending from said predetermined location to an object which may be placed on said surface area, each said lighting device including a subject-illuminating lamp, and means supporting each lamp for adjustment, whereby all of said lamps may be adjusted independently with respect to each other.

14. In a lighting system for photography, a plurality of individual and separately operable photographic lighting devices, means mounting said lighting devices above a given horizontal surface area for rotation about a common vertical axis independently with respect to each other, said axis intersecting said surface area, means for indicating the location of said axis in the space between said surface area and a predetermined location thereabove; each said lighting device including a subject-illuminating lamp, and means supporting each lamp for adjustment whereby all of said lamps may be adjusted independently with respect to each other, wherein said means for indicating the axis is a spotlight fixedly mounted a predetermined distance above said surface area in a location such that the beam of light emitted thereby is coaxial with said axis, said beam of light being collimated.

15. In a lighting system for photography, a plurality of individual and separately operable photographic lighting devices, means mounting said lighting devices above a given horizontal surface area for rotation about a common vertical axis independently with respect to each other, said axis intersecting said surface area, means for indicating the intersection of said axis with said area; each said lighting device including a subject-illuminating lamp, and means supporting said lamp for universal adjustment both vertically and horizontally, whereby all of said lamps may be adjusted independently with respect to each other rotationally, vertically and horizontally, and means movable over a floor area for supporting a subject, said subject-supporting means including a platform having an upwardly facing surface, said platform surface having a substantially larger size than that necessary to support a subject alone, whereby a posed subject and subject-supporting props may be placed upon said platform and moved as a unit into position to be intersected by said axis.

16. In a lighting system for photography, a plurality of individual and separately operable photographic lighting devices, means mounting said lighting devices above a given horizontal surface area for rotation about a common vertical axis independently with respect to each other, said axis intersecting said surface area, means for indicating the intersection of said axis with said area; each said lighting device including a subject-illuminating lamp, and means supporting said lamp for universal adjustment both vertically and horizontally, whereby all of said lamps may be adjusted independently with respect to each other rotationally, vertically and horizontally, means movable over a floor area for supporting a subject, said subject-supporting means including a platform having an upwardly facing surface, said platform surface having a substantially larger size than that necessary to support a subject alone, whereby a posed subject and subject supporting props may be placed upon said platform and moved as a unit into position to be intersected by said axis, said indicating means being a stationary spotlight which casts a beam downwardly coaxially of said axis.

17. In a lighting system for photography, a plurality of individual and separately operable photographic lighting devices, means mounting said lighting devices above a given horizontal surface area for rotation about a common vertical axis independently with respect to each other, said axis intersecting said surface area, means for indicating the intersection of said axis with said area; each said lighting device including a subject-illuminating lamp, and means supporting said lamp for universal adjustment both vertically and horizontally, whereby all of said lamps may be adjusted independently with respect to each other rotationally, vertically and horizontally, said supporting means including an articulated arm and two swivel connections, said arm having a length and said swivel connections being positioned such that said lamp may be selectively positioned in a plurality of different predetermined locations spaced from said axis, said lamp at one of said locations illuminating a subject intersected by said axis with one unit of light, said other locations illuminating a subject intersected by said axis with about $1/2X$ unit of light, X being equal to one of the group of integers 1, 2 and 4.

18. In a lighting system for photography, a plurality of individual and separately operable photographic lighting devices, means mounting said lighting devices above a given horizontal surface area for rotation about a common vertical axis independently with respect to each other, said axis intersecting said surface area, means for indicating the location of said axis in the space between said surface area and a predetermined location thereabove; each said lighting device including a subject-illuminating lamp, said lamps being selectively positioned in a plurality of different predetermined locations spaced from said axis, one lamp at one location illuminating a subject intersected by said axis with one unit of light, a second lamp at a second one of said locations illuminating said subject with about $1/2X$ unit of light, X being equal to one of the group of integers 1, 2, and 4.

References Cited

UNITED STATES PATENTS

| | | | |
|---|---|---|---|
| 1,831,152 | 11/1931 | Weisker | 240—1.3 |
| 3,240,925 | 3/1966 | Paschke et al. | 240—1.3 X |
| 3,258,585 | 6/1966 | Crete | 240—1.3 |
| 2,919,098 | 12/1959 | Mull et al. | 240—1.4 XR |

FOREIGN PATENTS

| | | |
|---|---|---|
| 1,097,928 | 1/1961 | Germany. |
| 480,861 | 5/1953 | Italy. |
| 133,213 | 10/1951 | Sweden. |

NORTON ANSHER, *Primary Examiner.*

JOHN M. HORAN, *Examiner.*

FRED L. BRAUN, *Assistant Examiner.*